(12) United States Patent
Mizuno et al.

(10) Patent No.: US 11,180,059 B2
(45) Date of Patent: Nov. 23, 2021

(54) VEHICLE SEAT DEVICE

(71) Applicant: AISIN SEIKI KABUSHIKI KAISHA, Kariya (JP)

(72) Inventors: Ryosuke Mizuno, Kariya (JP); Shogo Sakai, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 80 days.

(21) Appl. No.: 16/680,574

(22) Filed: Nov. 12, 2019

(65) Prior Publication Data

US 2020/0156515 A1 May 21, 2020

(30) Foreign Application Priority Data

Nov. 19, 2018 (JP) .............................. JP2018-216161

(51) Int. Cl.
*B60N 2/32* (2006.01)
*B60N 2/30* (2006.01)
*B60N 2/90* (2018.01)
*B60N 2/26* (2006.01)

(52) U.S. Cl.
CPC ................. *B60N 2/32* (2013.01); *B60N 2/26* (2013.01); *B60N 2/3084* (2013.01); *B60N 2/3086* (2013.01); *B60N 2/914* (2018.02)

(58) Field of Classification Search
CPC ...... B60N 2/99; B60N 2/3081; B60N 2/3084; B60N 2/3086; B60N 2/914; B60N 2/32
See application file for complete search history.

(56) References Cited

U.S. PATENT DOCUMENTS

| 5,938,237 | A | * | 8/1999 | Abels | ...................... | B60N 2/79 280/753 |
| 6,616,229 | B2 | * | 9/2003 | Kuster | ..................... | B60N 2/99 297/284.9 |
| 7,909,403 | B2 | * | 3/2011 | Lawall | .................. | B60N 2/986 297/284.9 |
| 2018/0134186 | A1 | | 5/2018 | Mizuno et al. | | |

FOREIGN PATENT DOCUMENTS

JP 2018-79800 A 5/2018

* cited by examiner

*Primary Examiner* — David R Dunn
*Assistant Examiner* — Tania Abraham
(74) *Attorney, Agent, or Firm* — Oblon, McClelland, Maier & Neustadt, L.L.P.

(57) ABSTRACT

A vehicle seat device includes: a base member provided in a seat cushion or a seat back; a movable member rotatably connected to the base member; and stopper parts disposed to abut against each other on the base and movable members. The movable member rotates from a storage position and the rotation of the movable member is restricted at a deployment position so that a seat mode is changed. The vehicle seat device further includes an air bag interposed between the base and movable members and presses the base and movable members to rotate the movable member; and a clutch mechanism interposed between the base and movable members, allowing the rotation of the movable member in a deployment direction, and restricting the rotation of the movable member in a storage direction.

10 Claims, 10 Drawing Sheets

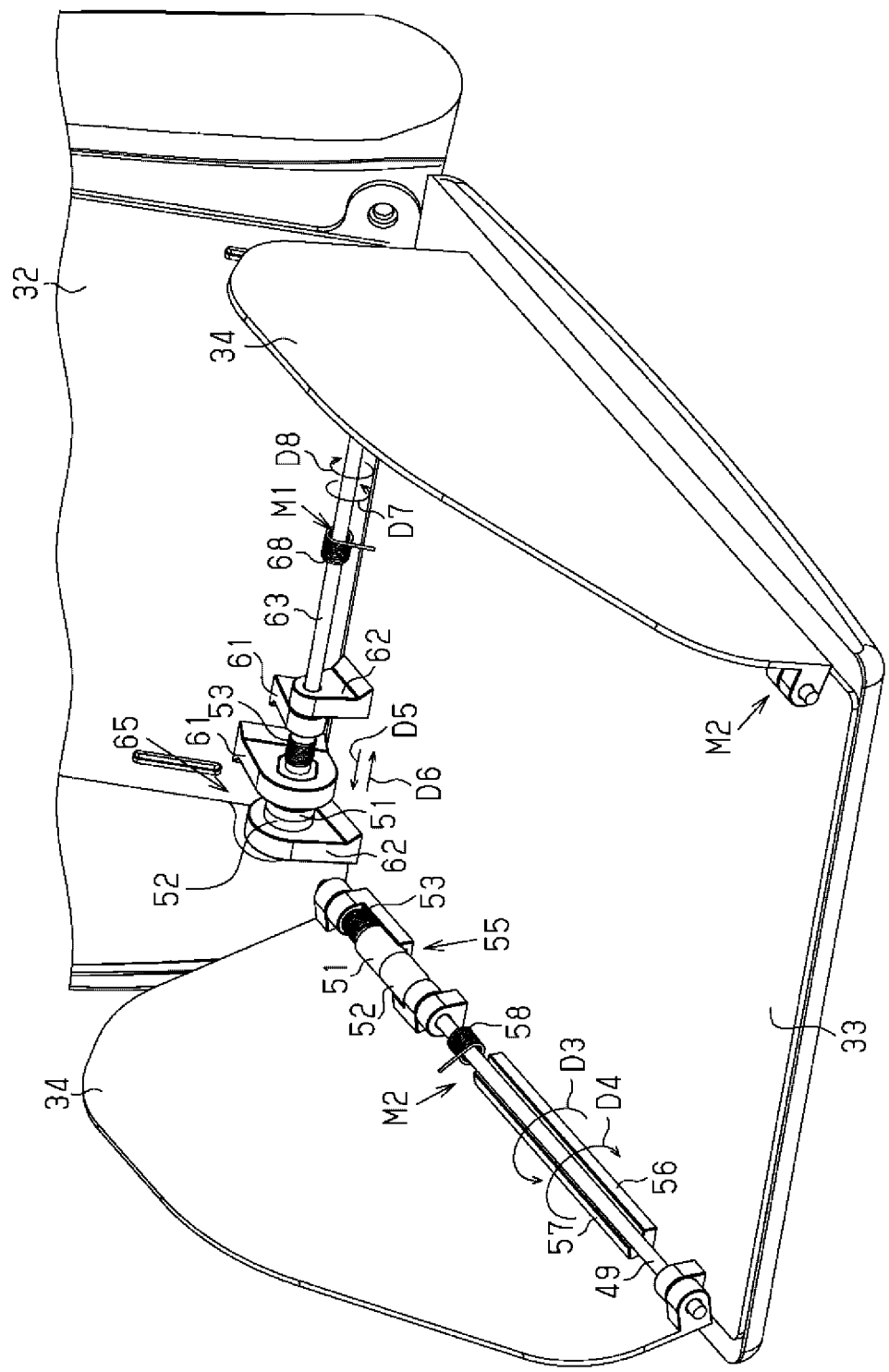

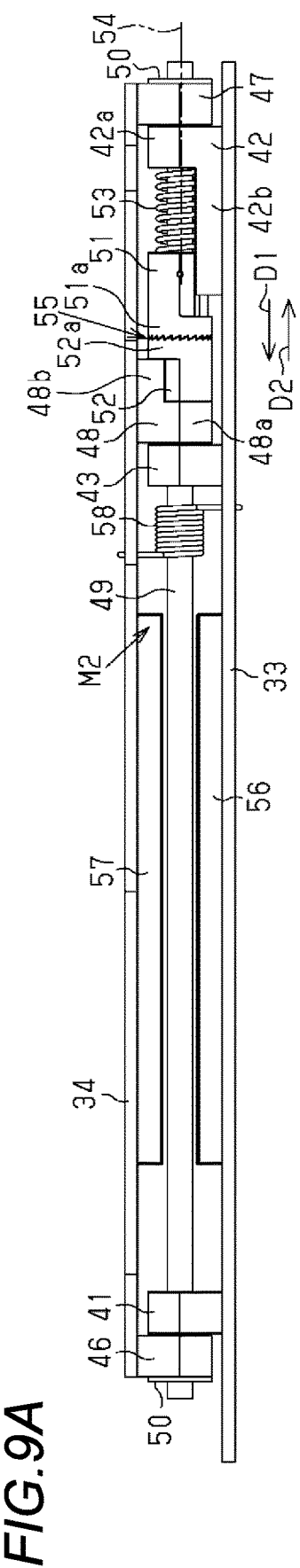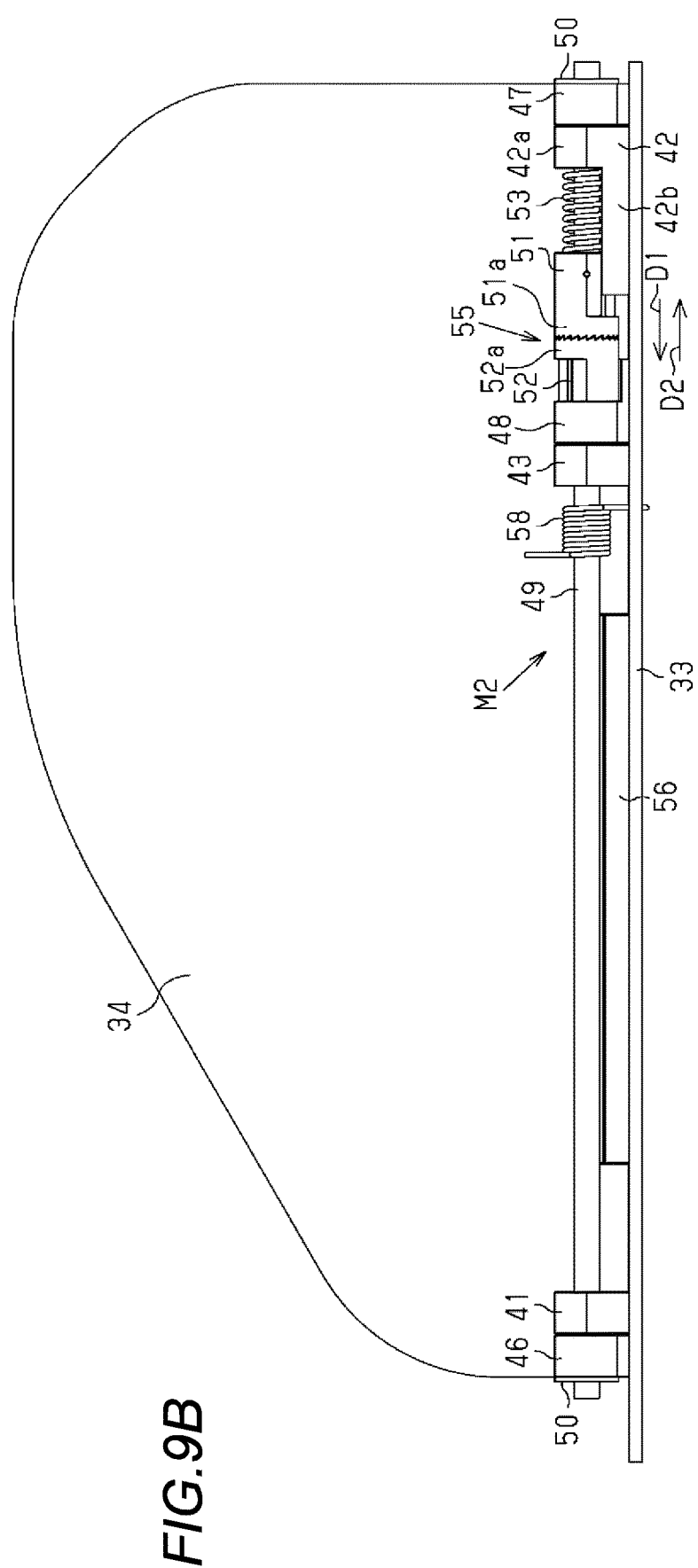

VEHICLE SEAT DEVICE

CROSS REFERENCE TO RELATED APPLICATIONS

This application is based on and claims priority under 35 U.S.C. § 119 to Japanese Patent Application 2018-216161, filed on Nov. 19, 2018, the entire contents of which are incorporated herein by reference.

TECHNICAL FIELD

This disclosure relates to a vehicle seat device capable of changing a seat mode.

BACKGROUND DISCUSSION

In a related art, for example, JP 2018-79800A (Reference 1) discloses a vehicle seat device. This vehicle seat device is configured to include a base member (back base) which is provided in a seat back, a movable member (side paddle) which is rotatably connected to the base member, a pair of stopper parts which are disposed to abut each other against the base member and the movable member, and an air bag which is interposed between the base member and the movable member. In the vehicle seat device, the movable member rotates in a deployment direction which is one direction with respect to the base member, the rotation of the movable member is restricted at a deployment position at which both stopper parts abut against each other, and thus, a seat mode is changed from the normal mode to a child mode in which a child seat is deployed on a seat. In addition, in this case, the rotation of the movable member to the deployment position is automated by the air bag pressing the base member and the movable member by inflation of the air bag.

Meanwhile, in JP 2018-79800A, the movable member located at the deployment position is inhibited from rotating in a storage direction which is a direction opposite to the deployment direction by the air bag. Therefore, for example, if the air bag is compressed by an external force during a vehicle collision or the like, it may be difficult to hold the movable member at the deployment position.

Thus, a need exists for a vehicle seat device which is not susceptible to the drawback mentioned above.

SUMMARY

A vehicle seat device according to an aspect of this disclosure includes: a base member which is provided in one of a seat cushion and a seat back; a movable member which is rotatably connected to the base member; and a pair of stopper parts which are disposed so as to abut against each other on the base member and the movable member, in which the movable member rotates in a deployment direction which is one direction from a storage position, with respect to the base member, and the rotation of the movable member is restricted at a deployment position at which both the stopper parts abut against each other so that a seat mode is changed, and the vehicle seat device further includes an air bag which is interposed between the base member and the movable member and presses the base member and the movable member as the air bag is inflated to rotate the movable member from the storage position toward the deployment position, and a clutch mechanism which is interposed between the base member and the movable member, allows the rotation of the movable member in the deployment direction, and restricts the rotation of the movable member, which is located at the deployment position, in a storage direction opposite to the deployment direction.

BRIEF DESCRIPTION OF THE DRAWINGS

The foregoing and additional features and characteristics of this disclosure will become more apparent from the following detailed description considered with the reference to the accompanying drawings, wherein:

FIG. 8 is an enlarged view of FIG. 7B;

FIGS. 9A and 9B are side views showing a state where a cushion side base is located at a storage position and a deployment position in the vehicle seat device of the embodiment;

DETAILED DESCRIPTION

Figure 1:
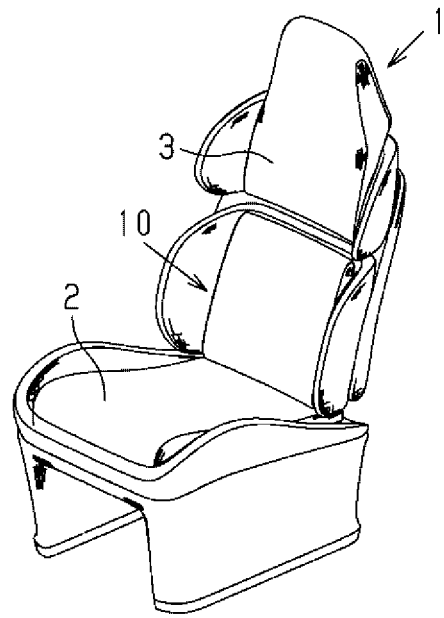
FIG. 1 is a perspective view showing a structure of an embodiment of a vehicle seat device in a normal mode.

Hereinafter, an embodiment of a vehicle seat device will be described. As shown in FIG. 1, a vehicle seat 1 is configured to include a seat cushion 2 which is placed on a vehicle floor, and a seat back 3 which is tiltably (rotatably)

supported at a rear end portion of the seat cushion 2. An inclination angle of the seat back 3 with respect to the seat cushion 2 is adjusted by a reclining mechanism (not shown) which is provided around an axis of the seat back. Basically, the seat cushion 2 and the seat back 3 respectively constitute a seating portion and a backrest portion of a seated person who sits on the seat 1. In this case, a state of the seat 1 is referred to as a normal mode. Moreover, the seat 1 can store a child seat 10 in a deployable manner.

Figure 2:
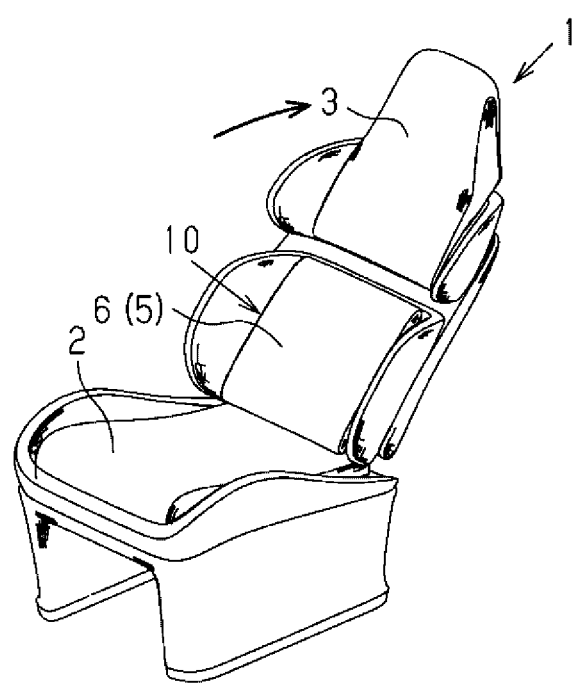
FIG. 2 is a perspective view showing the structure of the vehicle seat device of the embodiment in which a seat back is relatively largely tilted from the normal mode.
Figure 3A:
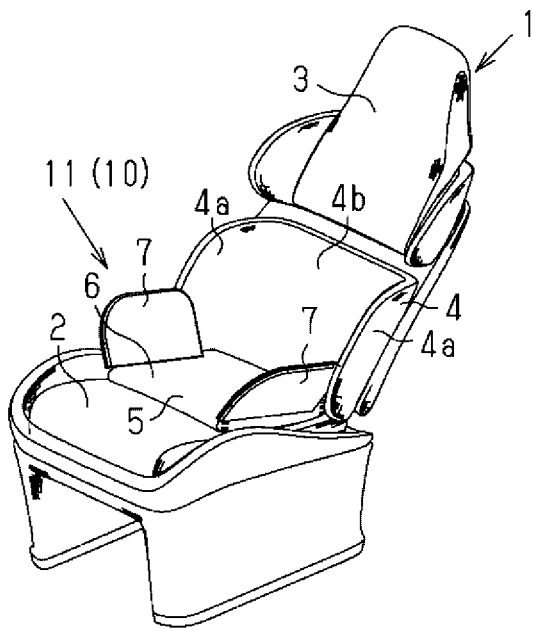
FIGS. 3A and 3B are perspective views showing the structure of the vehicle seat device of the embodiment in a baby mode.
Figure 3B:
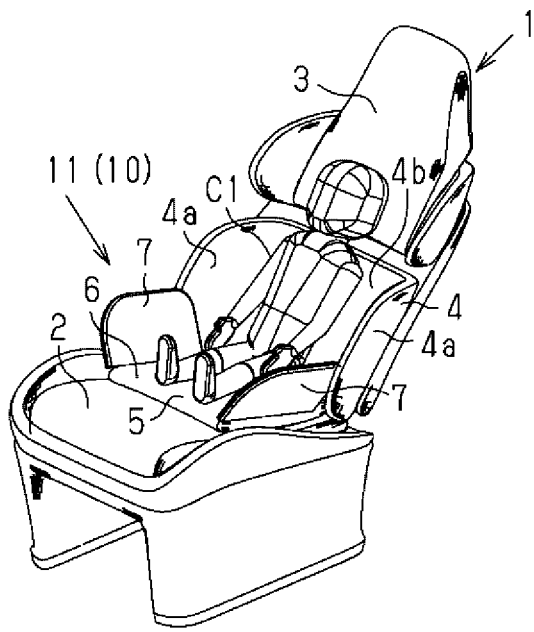
Figure 4:
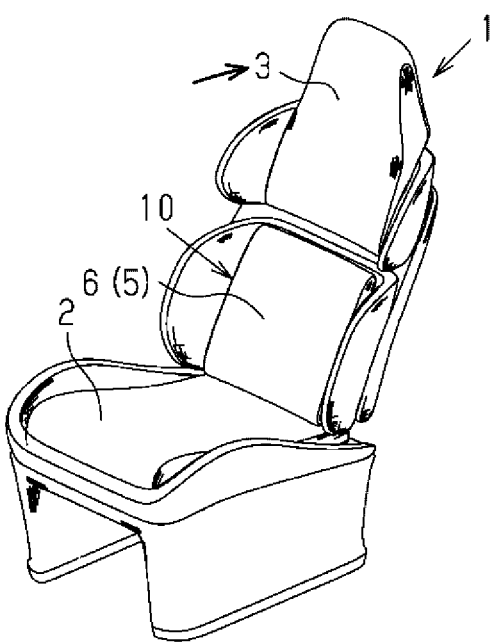
FIG. 4 is a perspective view showing the structure of the vehicle seat device of the embodiment in which a seat back is relatively small tilted from the normal mode.
Figure 5A:
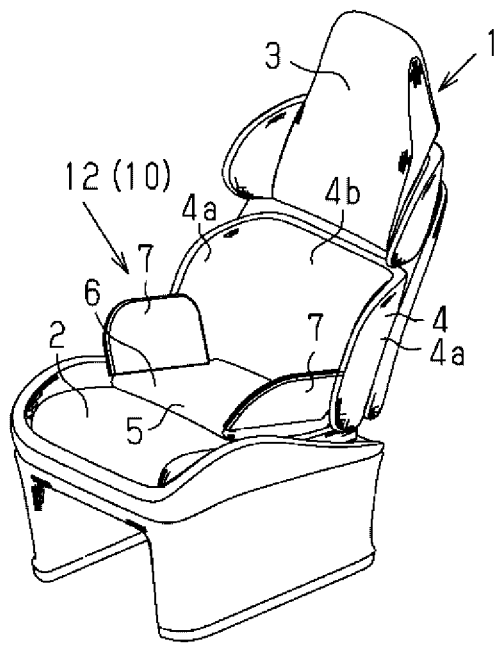
FIGS. 5A and 5B are perspective views showing the structure of the vehicle seat device of the embodiment in a child mode.
Figure 5B:
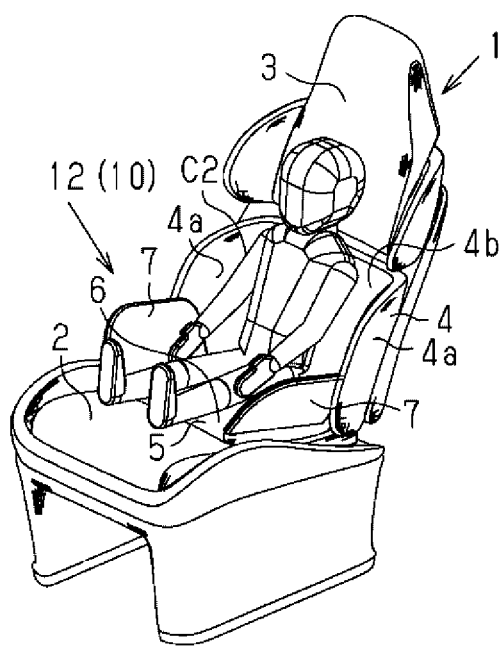

That is, as shown in FIGS. 2, 3A, and 3B, the seat back 3 has a back body 4 and a movable cushion 5. In the back body 4, a pair of side support portions 4a protrude forward from lower portions of both edge portions in a width direction of the back body 4, and a storage recessed portion 4b which is recessed rearward is formed between both side support portions 4a. The movable cushion 5 includes a cushion body 6 which is rotatably connected to a lower end portion of the back body 4 around an axis extending in a width direction, and a pair of paddles 7 which are rotatably connected to both edge portions of the cushion body 6 in the width direction.

In addition, the movable cushion 5 is opened with respect to the back body 4 so that the cushion body 6 is located on the seat cushion 2, both paddles 7 are opened with respect to the cushion body 6 in the width directions opposite to each other, and thus, the movable cushion 5 reaches a deployment state. Meanwhile, the movable cushion 5 is closed with respect to the back body 4 to be received in the storage recessed portion 4b in a state where both paddles 7 are closed to be folded with respect to the cushion body 6, and thus, the movable cushion 5 reaches a storage state.

Here, as shown by a change from FIG. 1 to FIGS. 2, 3A, and 3B, a state where the movable cushion 5 is deployed while the seat back 3 (back body 4) is relatively largely tilted is referred to as a baby mode as a child seat mode. In this baby mode, a child seat 11 provided, which is suitable for seating a small child C1 such as a baby or an infant. Moreover, as shown by a change from FIG. 1 to FIGS. 4, 5A, and 5B, a state where the movable cushion 5 is deployed while the seat back 3 (back body 4) is relatively small tilted is referred to as a child mode as the child seat mode. In this child mode, a child seat 12 is provided, which is suitable for seating a relatively small child (toddler) C2 who has grown more than the small child C1.

Figure 6A:
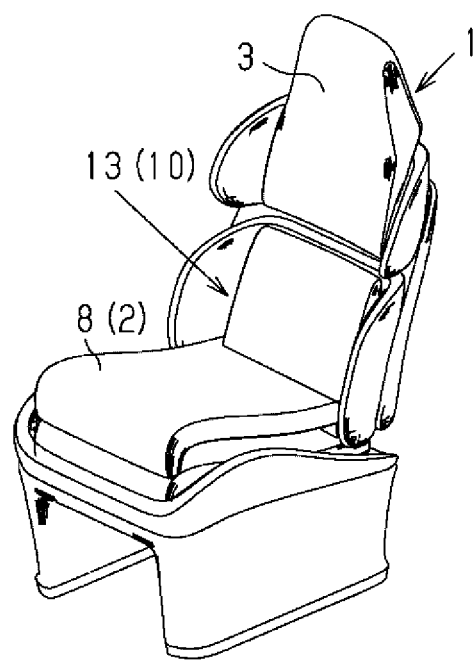
FIGS. 6A and 6B are perspective views showing the structure of the vehicle seat device of the embodiment in a booster mode.
Figure 6B:
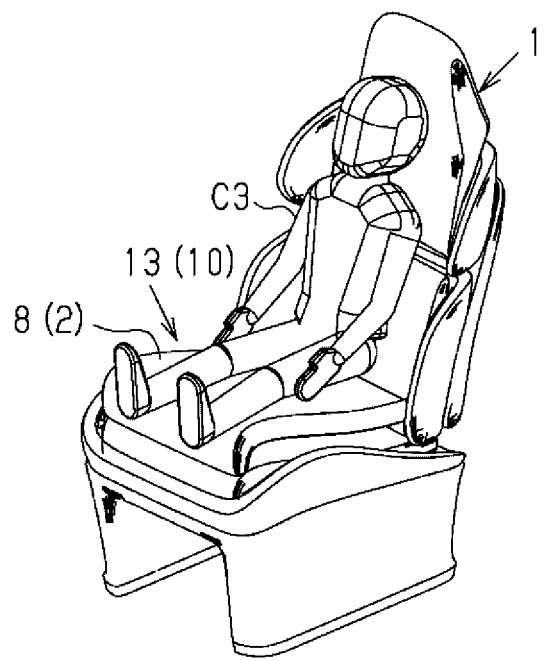

Moreover, as shown in FIGS. 6A and 6B, the seat 1 includes a booster seat 8 which divides the seat cushion 2 and moves upward. A state where the booster seat 8 moves upward is referred to as a booster mode. In this booster mode, a child seat 13 is provided, which is suitable for seating a relatively large child C3 which has grown more than the child C2.

Figure 7B:
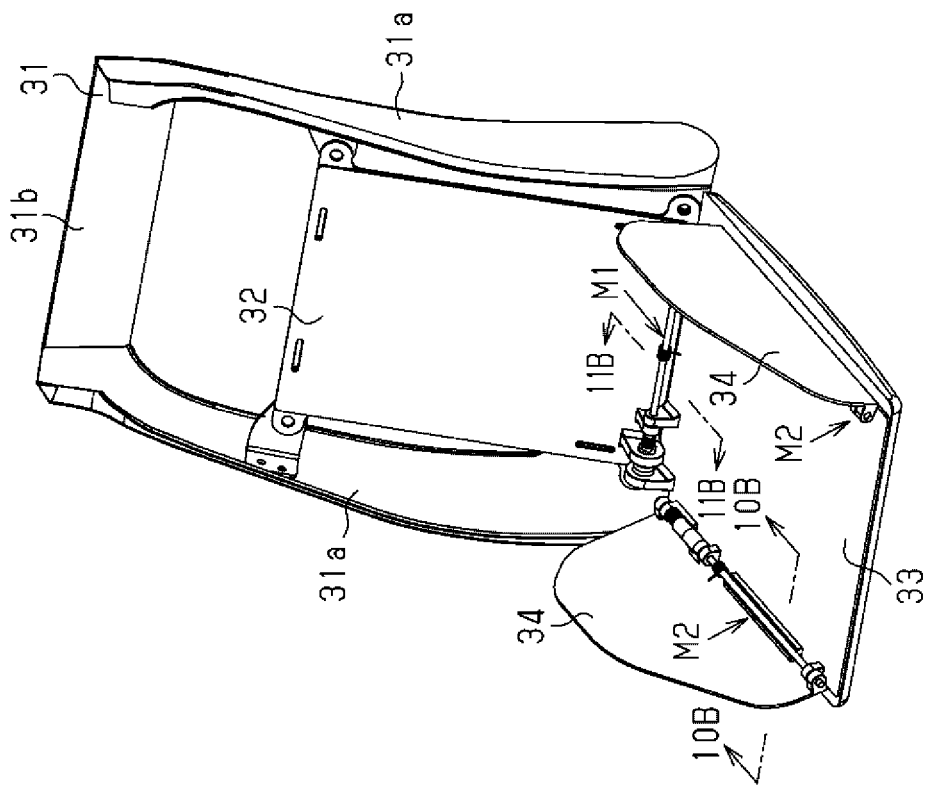
FIGS. 7A and 7B are perspective views showing a frame structure of the seat back in the vehicle seat device of the embodiment in the normal mode and a child seat mode.
Figure 7A:
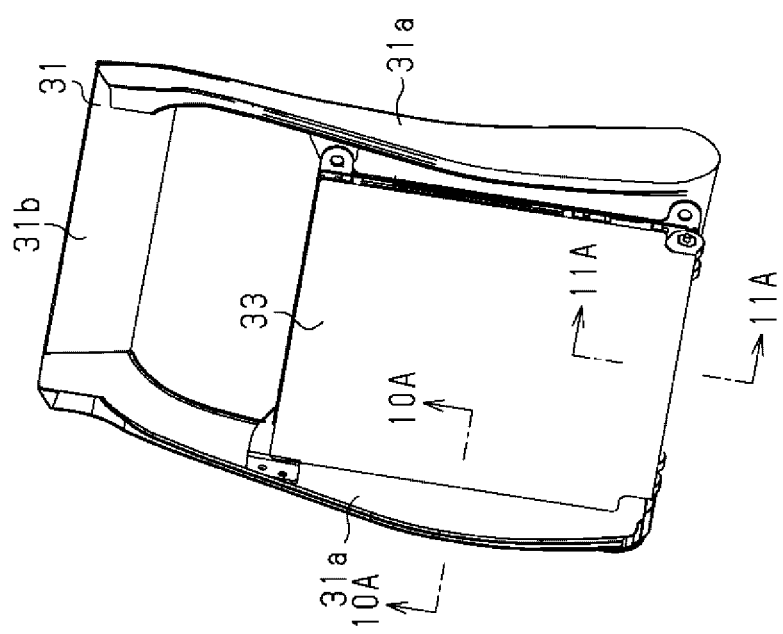

Next, a frame structure of the seat back 3 will be described. As shown in FIGS. 7A and 7B, for example, the seat back 3 (back body 4) has a base frame 31 which is formed in accordance with an outer shape of the seat back 3 and is made of a steel plate. The base frame 31 has a U shape including a pair of side frames 31a which extend in a vertical direction at an interval in a width direction and an upper frame 31b which connects upper ends of both side frames 31a to each other in the width direction. Moreover, in the base frame 31, for example, a substantially rectangular back base 32 which is made of a metal is connected to a lower portion of the base frame 31 so as to straddle between both side frames 31a.

In the back base 32, for example, a substantially rectangular cushion base 33 which is made of a metal plate is rotatably connected to a lower end of the back base. That is, a first rotation mechanism M1 is interposed between the lower end of the back base 32 and a distal end (rear end) of the cushion base 33 facing the lower end. A rotation of the cushion base 33 is controlled by the first rotation mechanism M1 between a storage position at which the cushion base 33 stands along the back base 32 and a deployment position at which the cushion base 33 is opened with respect to the back base 32 so as to be located on the seat cushion 2.

Moreover, for example, a pair of substantially rectangular cushion side bases 34 made of a metal plate are rotatably connected to the cushion base 33 on both side portions in a width direction of the cushion base 33. That is, a second rotation mechanism M2 similar to the first rotation mechanism M1 is interposed between each side portion in the width direction of the cushion base 33 and the distal end (lower end) of the cushion side base 34 facing each side portion. A rotation of each cushion side base 34 is controlled by the second rotation mechanism M2 between a storage position at which the cushion side base 34 is folded along the cushion base 33 and a deployment position at which the cushion side bases 34 are opened with respect to the cushion base 33 in the width directions opposite each other.

Next, the second rotation mechanism M2 and a peripheral structure around thereof will be described. As shown in FIGS. 8, 9A, and 9B, in the cushion base 33 serving as a base member, a pair of bearings 41 and 42 protrude from both end portions in an axial direction of the cushion side base 34 serving as a movable member, and a bearing 43 protrudes between both bearings 41 and 42 in the direction. Both bearings 41 and 43 are formed in a substantially cylindrical shape which has an inner diameter equivalent to each other and is opened in the axial direction. The bearing 42 includes a substantially cylindrical bearing portion 42a which has an inner diameter equivalent to that of each of the bearings 41 and 43 and is opened in the axial direction, and a substantially block-shaped pedestal portion 42b which extends toward the bearing 43 on the cushion base 33 on the cushion base 33 side from an opening of the bearing portion 42a.

Meanwhile, in the cushion side base 34, a pair of bearings 46 and 47 protrude to be adjacent to both bearings 41 and 42 so as to be interposed between both bearings 41 and 42 in the axial direction, and a bearing 48 protrudes to the bearing 42 side to be adjacent to the bearing 43 in the axial direction. Both bearings 46 and 47 have an inner diameter equivalent to those of the bearings 41 and 43 or the like, and are formed in a substantially cylindrical shape which is opened in the axial direction. The bearing 48 includes a substantially cylindrical bearing portion 48a which has an inner diameter equivalent to that of each of the bearings 41 and 43 and is opened in the axial direction, and a substantially block-shaped pedestal portion 48b which extends toward the bearing 42 on the cushion side base 34 on the cushion side base 34 side from an opening of the bearing portion 48a.

A substantially columnar shaft 49 having an outer diameter equivalent to the inner diameters of the bearings 41, 43, 46, and 47 and the bearing portions 42a and 48a is rotatably inserted into these. A pair of substantially annular push nuts 50 are fitted to both end portions of the shaft 49 penetrating both bearings 46 and 47, and the shaft 49 is prevented from coming out. Accordingly, the cushion side bases 34 can rotate around the shaft 49 with respect to the cushion base 33.

Moreover, a stationary-side latch gear 51 is inserted into the shaft 49 so as to be movable in the axial direction between both bearings 42 and 48 in the axial direction. The stationary-side latch gear 51 is supported so as to be movable in the axial direction and to be non-rotatable on the pedestal portion 42b, and a distal end portion of the stationary-side latch gear 51 protruding from the pedestal portion 42b forms a substantially annular gear portion 51a. A distal end of the gear portion 51a facing the bearing 48 is engraved with substantially saw-toothed teeth which are uneven in the axial direction.

In addition, a movable-side latch gear 52 is inserted into the shaft 49 between the bearing 48 and the stationary-side latch gear 51 in the axial direction. The movable-side latch gear 52 is fixed to the pedestal portion 48b, and a distal end portion of the movable-side latch gear 52 protruding from the pedestal portion 48b forms a substantially annular gear portion 52a. A distal end of the gear portion 52a facing the stationary-side latch gear 51 is engraved with substantially saw-toothed teeth which are uneven in the axial direction. The stationary-side latch gear 51 meshes with the movable-side latch gear 52 according to a relative movement in a first direction D1 (in FIG. 9, for the sake of convenience, shifted in the radial direction) which is one direction of the axis, that is, in an axial direction approaching the movable-side latch gear 52. In addition, the meshing between the stationary-side latch gear 51 and the movable-side latch gear 52 is released according to a relative movement in a second direction D2 (in FIG. 9, for the sake of convenience, shifted in the radial direction) which is opposite to the first direction D1, that is, in an axial direction away from the movable-side latch gear 52.

For example, a latch biasing member 53 which is a coil spring wound around the shaft 49 is interposed between the bearing portion 42a and the stationary-side latch gear 51. The latch biasing member 53 biases the stationary-side latch gear 51 in the axial direction (first direction D1) in which the stationary-side latch gear 51 approaches the movable-side latch gear 52. Therefore, the stationary-side latch gear 51 and the movable-side latch gear 52 are normally held in a meshing state.

One terminal of a cable 54 which is pulled in the axial direction (second direction D2) in which the stationary-side latch gear 51 is away from the movable-side latch gear 52 is hooked to the stationary-side gear 51. Therefore, if the stationary-side latch gear 51 is pulled against a biasing force of the latch biasing member 53 by the cable 54, the meshing state between the movable-side latch gear 52 and the stationary-side latch gear 51 is released.

Moreover, when the stationary-side latch gear 51 and the movable-side latch gear 52 mesh with each other, the stationary-side latch gear 51 moves in the axial direction (second direction D2) away from the movable-side latch gear 52 while being guided by mutual inclinations of the substantially saw-toothed teeth, and thus, the cushion side base 34 can rotate in a deployment direction D3 which is one direction in which the cushion side base 34 is toward the deployment position. Meanwhile, sharp rising edges of the substantially saw-toothed teeth are mutually bitten to each other, and thus, the cushion side base 34 cannot rotate in a storage direction D4 which is an opposite direction toward the storage position. The stationary-side latch gear 51, the movable-side latch gear 52, and the latch biasing member 53 interposed between the cushion base 33 serving as the base member and the cushion side bases 34 serving as the movable member constitute a second clutch mechanism 55 which is a clutch mechanism functioning as a so-called one-way clutch, which allows the rotation in the deployment direction D3 and restricts the rotation in the storage direction D4.

For example, a second return spring 58 serving as a return spring which is a coil spring wound around the shaft 49 in the vicinity of the bearing 43 is interposed between the cushion base 33 and the cushion side base 34. One leg portion and the other leg portion of the second return spring 58 are respectively hooked to the cushion base 33 and the cushion side base 34, and thus, the second return spring 58 biases the cushion side base 34 such that the cushion side base 34 rotates in the storage direction D4 toward the storage position.

Figure 10A:
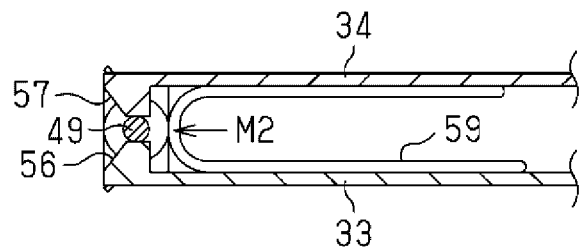
FIGS. 10A and 10B are cross-sectional views taken along line 10A-10A and line 10B-10B of FIG. 7.
Figure 10B:
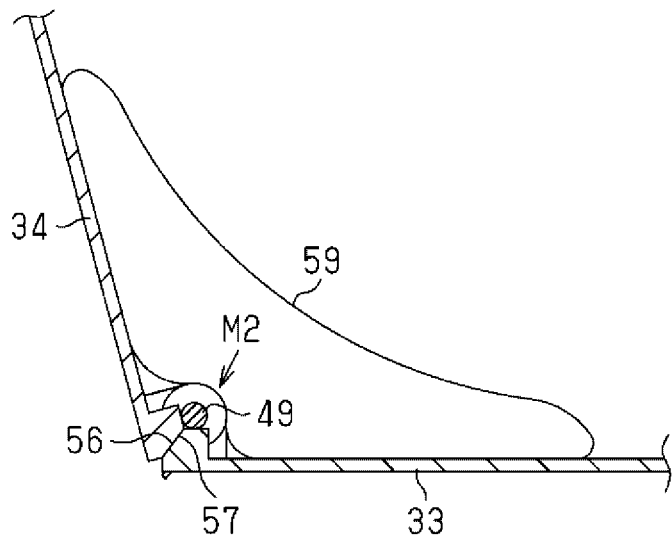

Moreover, second stopper parts 56 and 57 serving as a pair of stopper parts capable of abutting against each other protrude from the cushion base 33 serving as the base member and the cushion side base 34 serving as the movable member. Each of both the second stopper parts 56 and 57 has a substantially trapezoidal column shape extending along the shaft 49 between the bearings 41 and 43. As shown by a change from FIG. 10A to FIG. 10B, when the cushion side base 34 is located at the deployment position, both the second stopper parts 56 and 57 are set so as to abut against each other. That is, when the cushion side base 34 rotates in the deployment direction D3, the cushion side base 34 is set such that the rotation thereof is restricted at the deployment position where both the second stopper parts 56 and 57 abut against each other.

A second air bag 59 serving as an air bag is interposed between the cushion base 33 serving as the base member and the cushion side base 34 serving as the movable member. The second air bag 59 presses the cushion base 33 and the cushion side base 34 according to inflation of the second air bag 59, and thus, rotates the cushion side base 34 from the storage position to the deployment position. An expansion force of the second air bag 59 is set to be larger than a biasing force of the second return spring 58 when the cushion side base 34 rotates from the storage position to the deployment position.

Therefore, when the second air bag 59 is shrunk or can be shrunk and the meshing between the stationary-side latch gear 51 and the movable-side latch gear 52 of the second clutch mechanism 55 is released, the cushion side base 34 can rotate in the storage direction D4. In this case, the cushion side base 34 is biased by the second return spring 58 to reach (be returned) the storage position.

As shown in FIG. 8, a bearing 61 which protrudes from the back base 32 as the base member according to the bearings 41 to 43 and a bearing 62 which protrudes from the cushion base 33 as the movable member according to the bearings 47 to 48 are opened in an axial direction extending in the width direction of the cushion base 33. Moreover, a substantially columnar shaft 63 having an outer diameter equivalent to an inner diameter of each of the bearings 61 and 62 is inserted into the bearings 61 and 62 and is prevented from coming out. Accordingly, the cushion base 33 can rotate around the shaft 63 with respect to the back base 32.

Moreover, similarly, the first rotation mechanism M1 also includes a first clutch mechanism 65 which is a clutch mechanism including the stationary-side latch gear 51, the movable-side latch gear 52, and the latch biasing member 53 interposed between the back base 32 serving as the base member and the cushion base 33 serving as the movable member. Accordingly, the stationary-side latch gear 51 of the first clutch mechanism 65 meshes with the movable-side latch gear 52 according to a relative movement in a first direction D5 (in FIG. 8, for the sake of convenience, shifted in the radial direction) which is one direction of the axis, that is, in the axial direction approaching the movable-side latch gear 52. In this case, the cushion base 33 can rotate in a deployment direction D7 which is one direction toward a deployment position and cannot rotate in a storage direction D8 which is an opposite direction toward a storage position. In addition, the meshing between the stationary-side latch gear 51 and the movable-side latch gear 52 of the first clutch mechanism 65 is released according to a relative movement in a second direction D6 (in FIG. 8, for the sake of convenience, shifted in the radial direction) which is opposite to the first direction D5, that is, in an axial direction away from the movable-side latch gear 52. In this case, the cushion base 33 can rotate in a storage direction D8.

Moreover, similarly, the first rotation mechanism M1 also includes a first return spring 68 serving as a return spring which is interposed between the back base 32 serving the base member and the cushion base 33 serving as the movable member.

Figure 11A:
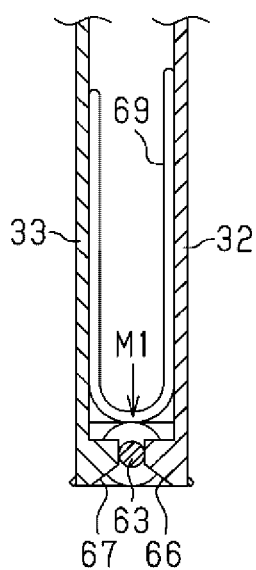
FIGS. 11A and 11B are cross-sectional views taken along line 11A-11A and line 11B-11B of FIG. 7.
Figure 11B:
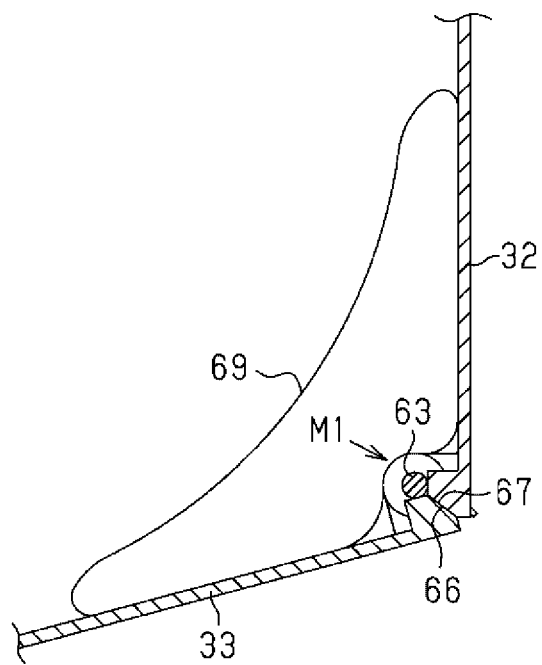

Moreover, as shown in FIGS. 11A and 11B, the first rotation mechanism M1 also includes a pair of first stopper parts 66 and 67 which are disposed so as to abut against each other on the back base 32 serving as the base member and the cushion base 33 serving as the movable member. In addition, similarly, the first rotation mechanism M1 also includes a first air bag 69 which is an air bag interposed between the back base 32 serving as the base member and the cushion base 33 serving as the movable member. Therefore, if the first air bag 69 is inflated, the cushion base 33 rotates in the deployment direction D7 against a biasing force of the first return spring 68, and reaches the deployment position at which both the first stopper parts 66 and 67 abut against each other according to the rotation of the cushion base 33.

When the first air bag 69 is shrunk or can be shrunk and the meshing between the stationary-side latch gear 51 and the movable-side latch gear 52 of the first clutch mechanism 65 is released, it is needless to say that the cushion base 33 can rotate in the storage direction D8. In this case, the cushion base 33 is biased by the first return spring 68 to reach (be returned) the storage position.

Figure 12A:
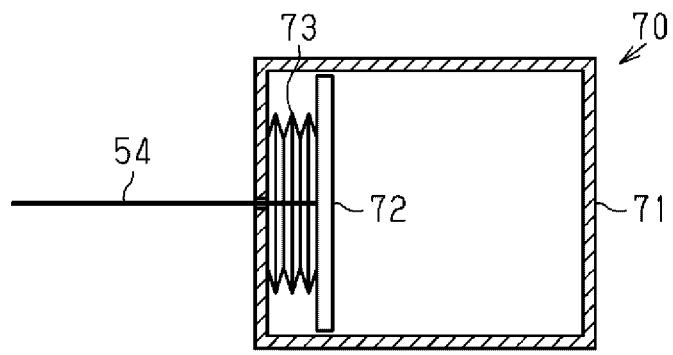
FIGS. 12A and 12B are cross-sectional views showing states before and after a movement member of a second release member in the vehicle seat device of the embodiment moves in a release direction.
Figure 12B:
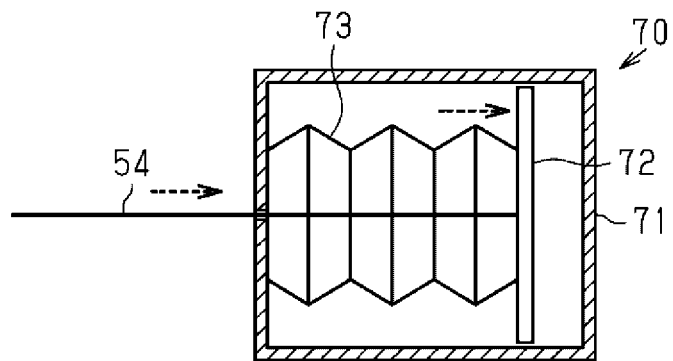

Next, a release member which moves the stationary-side latch gear 51 of the second clutch mechanism 55 in the axial direction (second direction D2) away from the movable-side latch gear 52 will be described. As shown in FIGS. 12A and 12B, a second release member 70 serving as the release member has a case 71 which is fixed at an appropriate location of the seat 1 and a flat plate-shaped movement member 72 which is movably accommodated in the case 71. The other terminal of the above-described cable 54 whose one terminal is hooked to the stationary-side latch gear 51 of each of both the second clutch mechanisms 55 is hooked to the movement member 72. In addition, the second release member 70 has a bellows-like second release air bag 73 serving as a release air bag interposed between the movement member 72 and the second release member 70 in the case 71 on a side where the cable 54 enters. An expansion force of the second release air bag 73 is set larger than a biasing force of the latch biasing member 53 when the stationary-side latch gear 51 moves in the second direction D2.

Here, if the second release air bag 73 is inflated, the movement member 72 is moved in a release direction which is one direction (right direction in FIGS. 12A and 12B) in the case 71 according to the inflation of the second release air bag 73. Accordingly, the cable 54 is pulled in this direction. In this case, the cable 54 is set to pull the stationary-side latch gear 51 of the second clutch mechanism 55 in the axial direction (second direction D2) away from the movable-side latch gear 52.

Therefore, if the second release air bag 73 is inflated when the cushion side base 34 is located at the deployment position, the movement member 72 moves in the release direction. Accordingly, the stationary-side latch gear 51 of the second clutch mechanism 55 is pulled in the axial direction away from the movable-side latch gear 52 by the cable 54. In this way, the cushion side base 34 can be rotated in the storage direction D4 by inflating the second release air bag 73.

Meanwhile, if the second release air bag 73 is shrunk (or can be shrunk), the stationary-side latch gear 51 of the second clutch mechanism 55 biased by the latch biasing member 53 moves in the axial direction (first direction D1) approaching the movable-side latch gear 52. Accordingly, the cushion side base 34 cannot be rotated in the storage direction D4. In this case, the cable 54 is pulled in this direction. In this case, the cable 54 pulls the movement member 72 in the reverse direction (left direction in FIGS. 12A and 12B).

Figure 13A:
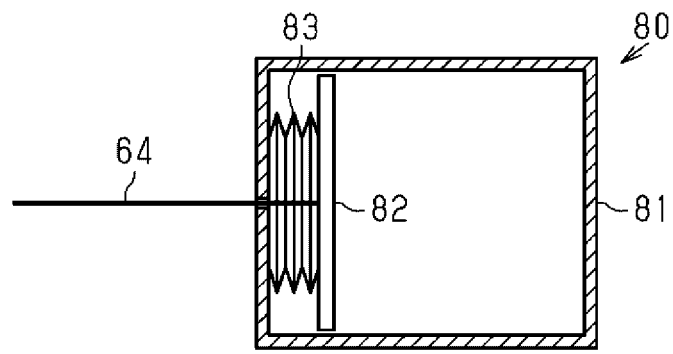
FIGS. 13A and 13B are cross-sectional views showing states before and after a movement member of a first release member in the vehicle seat device of the embodiment moves in a release direction.
Figure 13B:
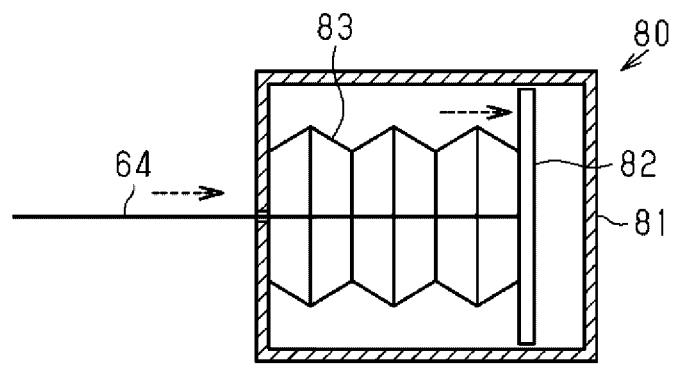

As shown in FIGS. 13A and 13B, similarly to the second clutch mechanism 55, a release member which moves the stationary-side latch gear 51 of the first clutch mechanism 65 in the axial direction (second direction D6) away from the movable-side latch gear 52 is provided. That is, similarly to the second clutch mechanism 55, a first release member 80 serving as the release member includes a case 81, a movement member 82, and a first release air bag 83. Moreover, the other terminal of a cable 64 whose one terminal is hooked to the stationary-side latch gear 51 of the first clutch mechanisms 65 is hooked to the movement member 82.

Accordingly, when the cushion base 33 is located at the deployment position, if the first release air bag 83 is inflated, similarly to the second clutch mechanism 55, the cushion base 33 can rotate in the storage direction D8. Meanwhile, if the first release air bag 83 is shrunk (or can be shrunk), similarly to the second clutch mechanism 55, the cushion base 33 cannot rotate in the storage direction D8.

Moreover, the cushion base 33 and both the cushion side bases 34 are covered with a skin or the like (not shown) together with the first air bag 69 and both the second air bags 59 to constitute the cushion body 6 and both the paddles 7 respectively.

Figure 14:
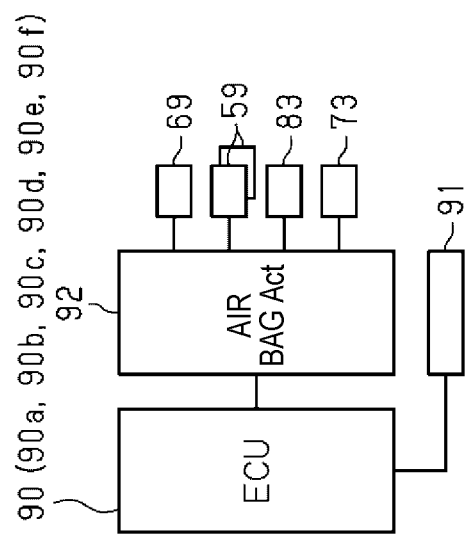
FIG. 14 is a block diagram showing an electrical configuration of the vehicle seat device of the embodiment.

Next, an electrical configuration of the present embodiment will be described. As shown in FIG. 14, for example, the seat 1 includes an electronic control unit (ECU) 90 serving as a control member mainly configured of a microcomputer, a child seat switch 91 electrically connected to the ECU 90, and an air bag actuator 92. The child seat switch 91 is an operation switch for outputting an operation signal indicating an intention to shift the seat 1 from either one of the normal mode and the child seat mode (baby mode or child mode) to the other. The air bag actuator 92 has a built-in air circuit which selectively supplies and discharges air to the first air bag 69, both the second air bags 59, the first release air bag 83, and the second release air bag 73, and inflates or shrinks these.

When an operation signal from the child seat switch 91 is input to the ECU 90, the ECU 90 controls the air bag actuator 92 to be driven to change the seat mode. In addition, for example, the ECU 90 may monitor the number of operations of the child seat switch 91 to detect a current seat mode, and when the ECU 90 includes a pressure sensor capable of detecting an internal pressure of the first air bag 69 or the like, the ECU 90 may monitor a detection signal.

Next, a control mode performed by the ECU 90 when the seat mode is changed from the normal mode to the child seat mode will be described. This processing is started by inputting the operation signal from the child seat switch 91 when the seat mode is in the normal mode.

Figure 15:
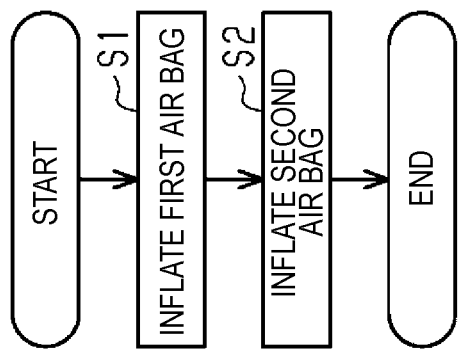
FIG. 15 is a flowchart showing a control mode by an ECU when the seat mode is changed from the normal mode to the child seat mode in the vehicle seat device of the embodiment.

As shown in FIG. 15, when the processing proceeds to this routine, the ECU 90 controls the air bag actuator 92 to be driven to inflate the first air bag 69 (Step S1: first deployment driving unit 90a). In this case, when the first air bag 69 is inflated, as described above, the cushion base 33 rotates in the deployment direction D7 together with both the cushion side bases 34 located the storage position to reach the deployment position.

Subsequently, the ECU 90 controls the air bag actuator 92 to be driven to inflate both the second air bags 59 (Step S2: second deployment driving unit 90b), and ends the processing. In this case, both the second air bags 59 are inflated, and thus, as described above, both the cushion side bases 34 are rotated in the deployment direction D3 and reach the deployment position.

Accordingly, the change of the seat mode from the normal mode to the child seat mode is completed. Next, a control mode performed by the ECU 90 when the seat mode is changed from the child seat mode to the normal mode will be described. This processing is started by inputting an operation signal from the child seat switch 91 when the seat mode is the child seat mode.

Figure 16:
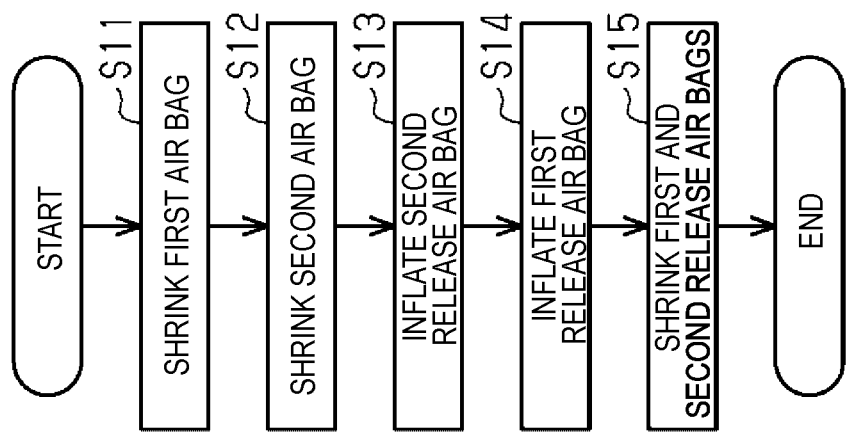
FIG. 16 is a flowchart showing a control mode by the ECU when the seat mode is changed from the child mode to the normal mode in the vehicle seat device of the embodiment.

As shown in FIG. 16, when the processing proceeds to this routine, the ECU 90 controls the air bag actuator 92 to be driven to shrink the first air bag 69 (Step S11: first storage driving unit 90c) and controls the air bag actuator 92 to be driven to shrink both the second air bags 59 (Step S12: second storage driving unit 90d).

Subsequently, the ECU 90 controls the air bag actuator 92 to be driven to inflate the second release air bag 73 (Step S13: third storage driving unit 90e). That is, the ECU 90 causes the second storage driving unit 90d to shrink the second air bag 59, and thereafter, causes the third storage driving unit 90e to inflate the second release air bag 73 of the second release member 70. In this case, the stationary-side latch gear 51 of each of both the second clutch mechanisms 55 moves in the axial direction (second direction D2) away from the movable-side latch gear 52 against the biasing force of the latch biasing member 53, and thus, the meshing state between the stationary-side latch gear 51 and the movable-side latch gear 52 is released. Accordingly, each of both the cushion side bases 34 is biased by the second return spring 58 and rotates in the storage direction D4 to reach the storage position.

Subsequently, the ECU 90 controls the air bag actuator 92 to be driven to inflate the first release air bag 83 (Step S14: fourth storage driving unit 90f). That is, when each cushion side base 34 is located at the storage position after the ECU 90 causes the first storage driving unit 90c to shrink the first air bag 69, that is, after the ECU 90 causes the third storage driving unit 90e to reach each cushion side base 34 at the storage position, the ECU 90 causes the fourth storage driving unit 90f to inflate the first release air bag 83 of the first release member 80. In this case, the stationary-side latch gear 51 of the first clutch mechanisms 65 moves in the axial direction (second direction D6) away from the movable-side latch gear 52 against the biasing force of the latch biasing member 53, and thus, the meshing state between the stationary-side latch gear 51 and the movable-side latch gear 52 is released. Accordingly, the cushion base 33 is biased by the first return spring 68 together with both the cushion side bases 34 located at the storage position and rotates in the storage direction D8 to reach the deployment position.

Thereafter, the ECU 90 controls the air bag actuator 92 to be driven to shrink the first and second release air bags 83 and 73 (Step S15) and ends the processing. Accordingly, the change of the seat mode from the child seat mode to the normal mode is completed.

An operation and effect of the present embodiment will be described.

(1) In the present embodiment, if the first air bag 69 is inflated, the first air bag 69 presses the back base 32 and the cushion base 33, and thus, the cushion base 33 rotates from the storage position to the deployment position. In addition, the rotation in the storage direction D8 of the cushion base 33 located at the deployment position is restricted by the first clutch mechanism 65. Accordingly, the cushion base 33 can be held more firmly at the deployment position.

Similarly, if the second air bag 59 is inflated, the second air bag 59 presses the cushion base 33 and the cushion side base 34, and thus, the cushion side base 34 rotates from the storage position to the deployment position. In addition, the rotation in the storage direction D4 of the cushion side base 34 located at the deployment position is restricted by the second clutch mechanism 55. Accordingly, the cushion side base 34 can be held more firmly at the deployment position.

(2) In the present embodiment, when the cushion base 33 is located at the deployment position, if the stationary-side latch gear 51 is relatively moved in the second direction D6 by the first release member 80, the stationary-side latch gear 51 and the movable-side latch gear 52 are disengaged, and the cushion base 33 can rotate in the storage direction D8. In this case, if the first air bag 69 is shrunk or can be shrunk, the cushion base 33 is biased by the first return spring 68 and rotates in the storage direction D8. In this way, the cushion base 33 can be rotated in the storage direction D8 to reach (be returned to) the storage position by cooperation of the first release member 80 and the first return spring 68.

Similarly, when the cushion side base 34 is located at the deployment position, if the stationary-side latch gear 51 is relatively moved in the second direction D2 by the second release member 70, the stationary-side latch gear 51 and the movable-side latch gear 52 are disengaged, and the cushion side base 34 can rotate in the storage direction D4. In this case, if the second air bag 59 is shrunk or can be shrunk, the cushion side base 34 is biased by the second return spring 58 and rotates in the storage direction D4. In this way, the cushion side base 34 can be rotated in the storage direction D4 to reach (be returned to) the storage position by cooperation of the second release member 70 and the second return spring 58.

(3) In the present embodiment, when the cushion base 33 is located at the deployment position, if the first release air bag 83 is inflated, the movement member 82 moves in the release direction. Accordingly, the stationary-side latch gear 51 of the first clutch mechanism 65 is relatively moved in the second direction D6 by the cable 64. In this way, the stationary-side latch gear 51 and the movable-side latch gear 52 of the first clutch mechanism 65 can be disengaged only by inflating the first release air bag 83.

Similarly, when the cushion side base 34 is located at the deployment position, if the second release air bag 73 is inflated, the movement member 72 moves in the release direction. Accordingly, the stationary-side latch gear 51 of the second clutch mechanism 55 is relatively moved in the second direction D2 by the cable 54. In this way, the stationary-side latch gear 51 and the movable-side latch gear 52 of the second clutch mechanism 55 can be disengaged only by inflating the second release air bag 73.

(4) In the present embodiment, when the cushion base 33 and each cushion side base 34 are located at the storage positions, if the first and second air bags 69 and 59 are inflated, the cushion base 33 and each cushion side base 34 rotate toward the deployment position. Moreover, the rotations in the storage directions D8 and D4 of the cushion base 33 and each cushion side base 34 located at the deployment positions are restricted by the first and second clutch mechanisms 65 and 55. Accordingly, for example, even when the first and second air bags 69 and 59 are compressed by an external force during a vehicle collision or the like, the child seats 11 and 12 deployed on the seat cushion 2 can be more firmly held.

(5) In the present embodiment, the ECU 90 causes the first deployment driving unit 90a to inflate the first air bag 69, and thereafter, the ECU 90 causes the second deployment driving unit 90b to inflate the second air bag 59. Accordingly, after the cushion base 33 (cushion body 6) is opened with respect to the back base 32 so as to be located on the seat cushion 2, both the cushion side bases 34 are opened with respect to the cushion base 33 in the width directions opposite to each other. Therefore, the child seats 11 and 12 can be more smoothly deployed on the seat cushion 2. That is, the seat 1 can be more smoothly changed from the normal mode to the child seat mode.

(6) In the present embodiment, when the cushion base 33 and each cushion side base 34 are located at the deployment positions, if the stationary-side latch gear 51 is relatively moved in the second directions D6 and D2 by the first and second release members 80 and 70, the cushion base 33 and each cushion side base 34 can rotate in the storage directions D8 and D4. In this case, if the first and second air bags 69 and 59 are shrunk or can be shrunk, the cushion base 33 and each cushion side base 34 are biased by the first and second return springs 68 and 58 and are rotated in the storage directions D8 and D4. In this way, the cushion base 33 and each cushion side base 34 can be rotated in the storage directions D8 and D4 to reach (be returned to) the storage positions by cooperation of the first and second release members 80 and 70 and the first and second return springs 68 and 58.

(7) In the present embodiment, the ECU 90 causes the second storage driving unit 90d to shrink the second air bag 59, and thereafter, the ECU 90 causes the third storage driving unit 90e to inflate the second release air bag 73 of the second release member 70. Accordingly, each cushion side base 34 is biased by the second return spring 58 and is rotated in the storage direction D4. In addition, when each cushion side base 34 is located at the storage position after the ECU 90 causes the first storage driving unit 90c to shrink the first air bag 69, that is, after the ECU 90 causes the third storage driving unit 90e to reach each cushion side base 34 at the storage position, the ECU 90 causes the fourth storage driving unit 90f to inflate the first release air bag 83 of the first release member 80. Accordingly, the cushion base 33 is biased by the first return spring 68 and is rotated in the storage direction D8. In this way, after each cushion side base 34 is stored, the cushion base 33 is stored. Accordingly, the seat mode can be more smoothly changed from the child seat mode to the normal mode.

(8) In the present embodiment, it is possible to automatically open or close the cushion base 33 (cushion body 6) and both cushion side bases 34 (paddles 7) by the first and second air bags 69 and 59. Moreover, it is possible to automatically store the cushion base 33 (cushion body 6) and both cushion side bases 34 (paddles 7) by cooperation of the first and second release members 80 and 70 and the first and second return springs 68 and 58. That is, it is possible to automatically perform the deployment or storage of the child seats 11 and 12.

Figure 17A:
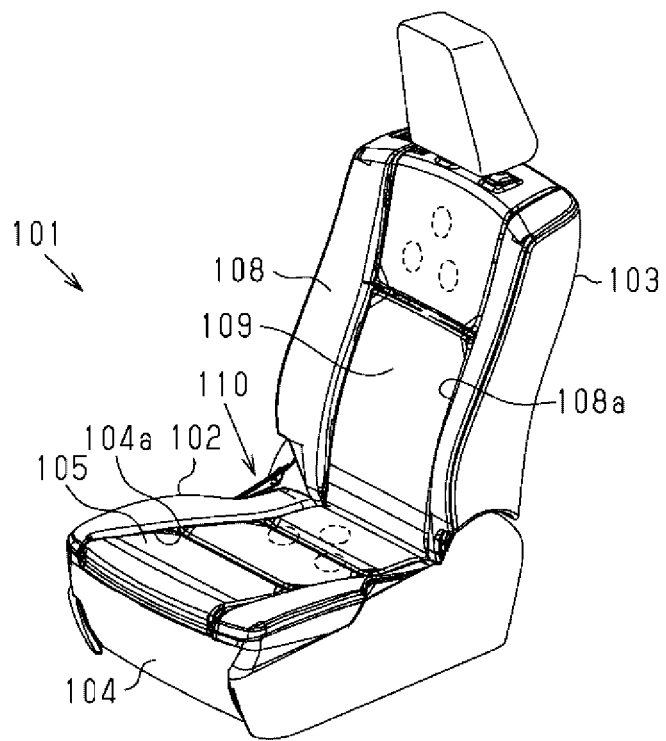
FIGS. 17A and 17B are perspective views showing a structure of a modification example of the vehicle seat device in a normal mode and a child seat mode.
Figure 17B:
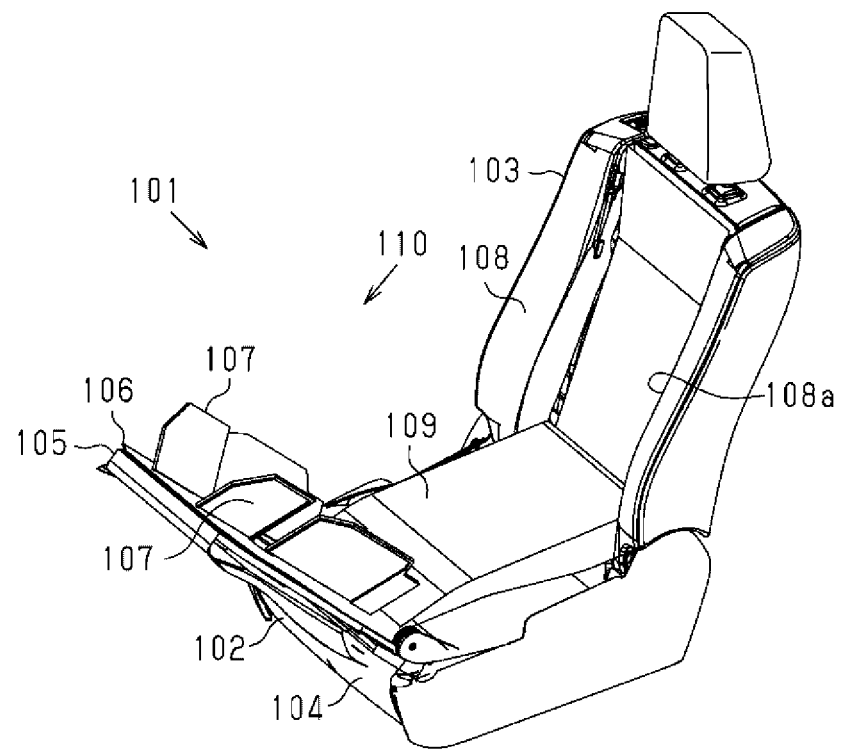

The present embodiment may be modified as follows. The present embodiment and the following modification example can be implemented in combination with each other within a technically consistent range. As shown in FIGS. 17A and 17B, a seat 101 may be configured such that a child seat 110 is divided into a seat cushion 102 and a seat back 103 and is stored in a deployable manner.

That is, the seat cushion 102 includes a cushion body 104 and a movable back 105. The movable back 105 includes a child back 106 which is rotatably connected to a front end portion of the cushion body 104 around an axis extending in a width direction, and a pair of paddles 107 which are rotatably connected to both side portions of the child back 106 in the width direction. The child back 106 is opened with respect to the cushion body 104 and both the paddles 107 are opened with respect to the child back 106 in the width directions opposite to each other. Accordingly, the movable back 105 reaches a deployment state. Meanwhile, the movable back 105 is closed with respect to the cushion body 104 to be received in a storage recessed portion 104a formed in the cushion body 104 in a state where both the paddles 107 are closed to be folded with respect to the child back 106, and thus, the movable back 105 reaches a storage state.

The seat back 103 has a back body 108 and a movable cushion 109 which is rotatably connected to a lower end portion of the back body 108 around an axis extending in a width direction. The movable cushion 109 is opened with respect to the back body 108 and reaches a deployment state. Meanwhile, the movable cushion 109 is closed with respect to the back body 108 to be received in a storage recessed portion 108a formed in the back body 108 and reaches a storage state.

Moreover, as shown in FIG. 17A, when both the movable back 105 and the movable cushion 109 are in the storage state, basically, the seat cushion 102 and the seat back 103 are in normal modes so as to respectively constitute a seating portion and a backrest portion of a seated person who sits on the seat 101.

Meanwhile, as shown in FIG. 17B, when both the movable back 105 and the movable cushion 109 are in the deployment state, the child seat 110 is deployed so as to face the seat back 103 in front of the seat back 103. In this case, the seat 101 is in a child seat mode in which the movable cushion 109 and the child back 106 respectively constitute a seating portion and a backrest portion of a small child who sits on the child seat 110.

Moreover, in the seat 101, a rotation mechanism according to the first and second rotation mechanisms M1 and M2 may be provided on at least one rotation shaft of the child back 106, the paddles 107, and the movable cushion 109. Accordingly, the child back 106, the paddles 107, or the movable cushion 109 provided with the rotation mechanism can be held more firmly at the deployment position.

In the embodiment, a seat may be configured in which the child seat is deployed only by opening the cushion body 6 (movable cushion 5) with respect to the back body 4 such that the cushion body 6 (movable cushion 5) is located on the seat cushion 2. That is, both the paddles 7 may be integrated into the cushion body 6 or may be omitted. In addition, also in this seat, a rotation mechanism according to the first rotation mechanism M1 may be provided on the rotation shaft of the cushion body 6.

In the embodiment, a seat may be configured in which the child seat is opened only by opening the pair of paddles 7 with respect to any one of the seat cushion 2 and the seat back 3 in the width directions opposite to each other. In addition, also in this seat, a rotation mechanism according to the second rotation mechanism M2 may be provided on the rotation shaft of each paddle.

In the embodiment, when the seat mode is changed from the child seat mode to the normal mode, the shrinkage (Step S12) of the second air bag 59 may be performed before the shrinkage (Step S11) of the first air bag 69 or the shrinkage of the second air bag 59 and the shrinkage of the first air bag 69 may be performed simultaneously.

In the embodiment, it is assumed that each cushion side base 34 reaches the storage position by inflating the second release air bag 73 of the second release member 70 by the third storage driving unit 90e, and thereafter, the first release air bag 83 of the first release member 80 is inflated by the fourth storage driving unit 90f. Meanwhile, in a case where an appropriate sensor capable of detecting that each cushion side base 34 reaches the storage position is provided, the first release air bag 83 of the first release member 80 may be inflated after the sensor detects that the cushion side base 34 reaches the storage position.

In the embodiment, a configuration of each of the first and second release members 80 and 70 may be arbitrarily changed as long as the stationary-side latch gear 51 can be relatively moved in the second directions D6 and D2. For example, each of the first and second release members 80 and 70 may be a manual or electric rotary lever which is mechanically linked to the stationary-side latch gear 51 and relatively moves the stationary-side latch gear 51 in the second directions D6 and D2.

In the embodiment, the stationary-side latch gear 51 is (relatively moved) moved with respect to the movable-side latch gear 52 in the axial direction, and thus, the stationary-side latch gear 51 and the movable-side latch gear 52 are engaged with each other or disengaged with each other. However, a relationship therebetween may be reversed. That is, the movable-side latch gear 52 may be moved with respect to the stationary-side latch gear 51 in the axial direction such that the stationary-side latch gear 51 and the movable-side latch gear 52 are engaged with each other or disengaged with each other.

In the embodiment, a configuration of each of the first and second clutch mechanisms 65 and 55 may be arbitrarily changed as long as the rotations thereof in the storage directions D8 and D4 can be restricted. For example, a clutch mechanism (one-way clutch) may be used, which includes a spur gear engraved with substantially saw-toothed teeth which are uneven in the radial direction and a substantially nail-shaped pawl.

In the embodiment, any one of the first clutch mechanism 65 and both the second clutch mechanisms 55 may be omitted. In the embodiment, an amount of inflation the first and second air bags 69 and 59 may be adjusted to control support shapes of the cushion body 6 and the paddle 7 according to a physique of each of the small children C1 and C2 seated on the child seats 12 and 13.

In the above embodiment, when a reclining mechanism related to adjustment of an inclination angle of the seat back 3 with respect to the seat cushion 2 is an electric reclining mechanism, the inclination angle may be automatically adjusted according to the change of the seat mode accompanying the operation of the child seat switch 91.

A vehicle seat device according to an aspect of this disclosure includes: a base member which is provided in one of a seat cushion and a seat back; a movable member which is rotatably connected to the base member; and a pair of stopper parts which are disposed so as to abut against each other on the base member and the movable member, in which the movable member rotates in a deployment direction which is one direction from a storage position, with respect to the base member, and the rotation of the movable member is restricted at a deployment position at which both the stopper parts abut against each other so that a seat mode is changed, and the vehicle seat device further includes an air bag which is interposed between the base member and the movable member and presses the base member and the movable member as the air bag is inflated to rotate the movable member from the storage position toward the deployment position, and a clutch mechanism which is interposed between the base member and the movable member, allows the rotation of the movable member in the deployment direction, and restricts the rotation of the movable member, which is located at the deployment position, in a storage direction opposite to the deployment direction.

According to this configuration, if the air bag is inflated, the air bag presses the base member and the movable member, and thus, the movable member rotates from the storage position toward the deployment position. In addition, the rotation in the storage direction of the movable member located at the deployment position is restricted by the clutch mechanism. Accordingly, the movable member can be more firmly held at the deployment position.

In the vehicle seat device, the clutch mechanism may include a movable-side latch gear provided in the movable member concentrically with an axis of the movable member, a stationary-side latch gear provided in the base member concentrically with the axis of the movable member and capable of meshing with the movable-side latch gear as the stationary-side latch gear relatively moves in a first direction which is one direction of the axis, and a latch biasing member which biases the stationary-side latch gear such that the stationary-side latch gear is relatively moved in the first direction, and the vehicle seat device may further include a return spring which rotates the movable member located at the deployment position in the storage direction, and a release member which relatively moves the stationary-side latch gear in a second direction opposite to the first direction against a biasing force of the latch biasing member.

According to this configuration, when the movable member is located at the deployment position, if the stationary-side latch gear is relatively moved in the second direction by the release member, the stationary-side latch gear and the movable-side latch gear are disengaged, and the movable member can rotate in the storage direction. In this case, the air bag is shrunk or can be shrunk, the movable member is biased by the return spring and rotates in the storage direction. In this way, the movable member is rotated in the storage direction to reach the storage position by cooperation of the release member and the return spring.

In the vehicle seat device, the release member may include a case, a movement member which is movably accommodated in the case, a cable whose one end is fixed to one of the stationary-side latch gear and the movable-side latch gear and whose other end is fixed to the movement member and which relatively moves the stationary-side latch gear in the second direction as the movement member moves in a release direction which is one direction, and a release air bag which is accommodated in the case and moves the movement member in the release direction as the release air bag is inflated.

According to this configuration, when the movable member is located at the deployment position, if the release air bag is inflated, the movement member moves in the release direction. Accordingly, the stationary-side latch gear is relatively moved in the second direction by the cable. In this way, the stationary-side latch gear and the movable-side latch gear can be disengaged by only inflating the release air bag.

In the vehicle seat device, the device may further include a back base provided in the seat back, a cushion base rotatably connected to the back base, a pair of cushion side bases rotatably connected to the cushion base on both side portions in a width direction of the cushion base, a first air bag serving as the air bag which is interposed between the back base serving as the base member and the cushion base serving as the movable member, a second air bag serving as the air bag which is interposed between the cushion base serving as the base member and each cushion side base serving as the movable member, a first clutch mechanism serving as the clutch mechanism which is interposed between the back base serving as the base member and the cushion base serving as the movable member, and a second clutch mechanism serving as the clutch mechanism which is interposed between the cushion base serving as the base member and each cushion side base serving as the movable member, in which when the cushion base reaches the deployment position from the storage position, the cushion base may be opened with respect to the back base to be located on the seat cushion, and when both the cushion side bases reach the deployment position from the storage position, both the cushion side bases may be opened with respect to the cushion base in width directions opposite to each other, and thereby the seat mode may be changed from a normal mode to a child seat mode in which a child seat is deployed on the seat cushion.

According to this configuration, when the cushion base and each cushion side base are located at the storage positions, if the first and second air bags are inflated, the cushion base and each cushion side base rotate toward the deployment position. Moreover, the rotations in the storage directions of the cushion base and each cushion side base located at the deployment positions are restricted by the first and second clutch mechanisms. Accordingly, the child seat deployed on the seat cushion can be more firmly held.

In the vehicle seat device, the device may further include an air bag actuator which individually supplies or discharges air to the first and second air bags, and a control member which controls the air bag actuator to be driven, in which the control member may include a first deployment driving unit which inflates the first air bag, and a second deployment driving unit which inflates the second air bag in a state where the first air bag is inflated.

According to this configuration, the control member causes the first deployment driving unit to inflate the first air bag, and thereafter, the control member causes the second deployment driving unit to inflate the second air bag. Accordingly, after the cushion base is opened with respect to the back base so as to be located on the seat cushion, both the cushion side bases are opened with respect to the cushion base in the width directions opposite to each other. Therefore, the child seat can be more smoothly deployed on the seat cushion.

In the vehicle seat device, the device may further include a back base which is provided in the seat back, a cushion base rotatably connected to the back base, a pair of cushion side bases rotatably connected to the cushion base on both side portions in a width direction of the cushion base, a first air bag serving as the air bag which is interposed between the back base serving as the base member and the cushion base serving as the movable member, a second air bag serving as the air bag which is interposed between the cushion base serving as the base member and each cushion side base serving as the movable member, a first clutch mechanism serving as the clutch mechanism which is interposed between the back base serving as the base member and the cushion base serving as the movable member, a second clutch mechanism serving as the clutch mechanism which is interposed between the cushion base serving as the base member and each cushion side base serving as the movable member, a first return spring serving as the return spring which rotates the cushion base serving as the movable member, which is located at the deployment position, in the storage direction, a second return spring serving as the return spring which rotates each cushion side base serving as the movable member, which is located at the deployment position, in the storage direction, a first release member serving as the release member which relatively moves the stationary-side latch gear of the back base serving as the base member in the second direction, and a second release member serving as the release member which relatively moves the stationary-side latch gear of each cushion base serving as the base member in the second direction, in which when the cushion base reaches the deployment position from the storage position, the cushion base may be opened with respect to the back base to be located on the seat cushion, and when both the cushion side bases reach the deployment position from the storage position, both the cushion side bases may be opened with respect to the cushion base in width directions opposite to each other, and thereby the seat mode may be changed from a normal mode to a child seat mode in which a child seat is deployed on the seat cushion.

According to this configuration, when the cushion base and each cushion side base are located at the storage positions, if the first and second air bags are inflated, the cushion base and each cushion side base rotate toward the deployment position. Moreover, the rotations in the storage directions of the cushion base and each cushion side base located at the deployment positions are restricted by the first and second clutch mechanisms. Accordingly, the child seat deployed on the seat cushion can be more firmly held.

Meanwhile, when the cushion base and each cushion side base are located at the deployment positions, if the stationary-side latch gear is relatively moved in the second direction by the first and second release members, the cushion base and each cushion side base can rotate in the storage direction. In this case, if the first and second air bags are shrunk or can be shrunk, the cushion base and each cushion side base are biased by the first and second return springs and are rotated in the storage direction. In this way, the cushion base and each cushion side base can be rotated in the storage direction to reach the storage position by cooperation of the first and second release members and the first and second return springs.

In the vehicle seat device, the device may further include an air bag actuator which individually supplies or discharges air to the first and second air bags and the release air bags of the first and second release members, and a control member which controls the air bag actuator to be driven, in which the control member may include a first storage driving unit which shrinks the first air bag, a second storage driving unit which shrinks the second air bag, a third storage driving unit which inflates the release air bag of the second release member in a state where the second air bag is shrunk, and a fourth storage driving unit which inflates the release air bag of the first release member when each cushion side base is located at the storage position in a state where the first air bag is shrunk.

According to this configuration, the control member causes the second storage driving unit to shrink the second air bag, and thereafter, the control member causes the third storage driving unit to inflate the release air bag of the second release member. Accordingly, each cushion side base is biased by the second return spring and is rotated in the storage direction. In addition, when each cushion side base is located at the storage position after the control member causes the first storage driving unit to shrink the first air bag, that is, after the control member causes the third storage driving unit to reach each cushion side base at the storage position, the control member causes the fourth storage driving unit to inflate the release air bag of the first release member. Accordingly, the cushion base is biased by the first return spring and is rotated in the storage direction. In this way, after each cushion side base is stored, the cushion base is stored. Accordingly, the seat mode can be more smoothly changed from the child seat mode to the normal mode.

According to the aspects of this disclosure, the movable member can be more firmly held at the deployment position.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat device comprising:
   a base member which is provided in one of a seat cushion and a seat back;
   a movable member which is rotatably connected to the base member; and
   a pair of stopper parts which are disposed so as to abut against each other on the base member and the movable member, wherein
   the movable member rotates in a deployment direction which is one direction from a storage position, with respect to the base member, and the rotation of the movable member is restricted at a deployment position at which both the stopper parts abut against each other so that a seat mode is changed,
   the vehicle seat device further comprises
       an air bag which is interposed between the base member and the movable member and presses the base member and the movable member as the air bag is inflated to rotate the movable member from the storage position toward the deployment position; and
       a clutch mechanism which is interposed between the base member and the movable member, allows the rotation of the movable member in the deployment direction, and restricts the rotation of the movable member, which is located at the deployment position, in a storage direction opposite to the deployment direction, the clutch mechanism includes
           a movable-side latch gear provided in the movable member concentrically with an axis of the movable member,
           a stationary-side latch gear provided in the base member concentrically with the axis of the movable member and capable of meshing with the movable-side latch gear as the stationary-side latch gear relatively moves in a first direction which is one direction of the axis, and
           a latch biasing member which biases the stationary-side latch gear such that the stationary-side latch gear is relatively moved in the first direction, and
   the vehicle seat device further comprises
       a return spring which rotates the movable member located at the deployment position in the storage direction, and
       a release member which relatively moves the stationary-side latch gear in a second direction opposite to the first direction against a biasing force of the latch biasing member.

2. The vehicle seat device according to claim 1, wherein the release member includes
   a case,
   a movement member which is movably accommodated in the case,
   a cable whose one end is fixed to one of the stationary-side latch gear and the movable-side latch gear and whose other end is fixed to the movement member and which relatively moves the stationary-side latch gear in the second direction as the movement member moves in a release direction which is one direction, and
   a release air bag which is accommodated in the case and moves the movement member in the release direction as the release air bag is inflated.

3. The vehicle seat device according to claim 2, further comprising:
   a back base provided in the seat back;
   a cushion base rotatably connected to the back base;
   a pair of cushion side bases rotatably connected to the cushion base on both side portions in a width direction of the cushion base;
   a first air bag serving as the air bag which is interposed between the back base serving as the base member and the cushion base serving as the movable member;
   a second air bag serving as the air bag which is interposed between the cushion base serving as the base member and each cushion side base serving as the movable member;
   a first clutch mechanism serving as the clutch mechanism which is interposed between the back base serving as the base member and the cushion base serving as the movable member; and
   a second clutch mechanism serving as the clutch mechanism which is interposed between the cushion base serving as the base member and each cushion side base serving as the movable member, wherein
   when the cushion base reaches the deployment position from the storage position, the cushion base is opened with respect to the back base to be located on the seat cushion, and when both the cushion side bases reach the deployment position from the storage position, both the cushion side bases are opened with respect to the cushion base in width directions opposite to each other, and thereby the seat mode is changed from a normal mode to a child seat mode in which a child seat is deployed on the seat cushion.

4. The vehicle seat device according to claim 3, further comprising:
   an air bag actuator which individually supplies or discharges air to the first and second air bags; and
   a control member which controls the air bag actuator to be driven, wherein
   the control member includes a first deployment driving unit which inflates the first air bag, and a second deployment driving unit which inflates the second air bag in a state where the first air bag is inflated.

5. The vehicle seat device according to claim 2, further comprising:

a back base provided in the seat back;

a cushion base rotatably connected to the back base;

a pair of cushion side bases rotatably connected to the cushion base on both side portions in a width direction of the cushion base;

a first air bag serving as the air bag which is interposed between the back base serving as the base member and the cushion base serving as the movable member;

a second air bag serving as the air bag which is interposed between the cushion base serving as the base member and each cushion side base serving as the movable member;

a first clutch mechanism serving as the clutch mechanism which is interposed between the back base serving as the base member and the cushion base serving as the movable member;

a second clutch mechanism serving as the clutch mechanism which is interposed between the cushion base serving as the base member and each cushion side base serving as the movable member;

a first return spring serving as the return spring which rotates the cushion base serving as the movable member, which is located at the deployment position, in the storage direction;

a second return spring serving as the return spring which rotates each cushion side base serving as the movable member, which is located at the deployment position, in the storage direction;

a first release member serving as the release member which relatively moves the stationary-side latch gear of the back base serving as the base member in the second direction; and a second release member serving as the release member which relatively moves the stationary-side latch gear of each cushion base serving as the base member in the second direction, wherein when the cushion base reaches the deployment position from the storage position, the cushion base is opened with respect to the back base to be located on the seat cushion, and when both the cushion side bases reach the deployment position from the storage position, both the cushion side bases are opened with respect to the cushion base in width directions opposite to each other, and thereby the seat mode is changed from a normal mode to a child seat mode in which a child seat is deployed on the seat cushion.

6. The vehicle seat device according to claim 5, further comprising:

an air bag actuator which individually supplies or discharges air to the first and second air bags and the release air bags of the first and second release members; and a control member which controls the air bag actuator to be driven, wherein the control member includes a first storage driving unit which shrinks the first air bag, a second storage driving unit which shrinks the second air bag, a third storage driving unit which inflates the release air bag of the second release member in a state where the second air bag is shrunk, and a fourth storage driving unit which inflates the release air bag of the first release member when each cushion side base is located at the storage position in a state where the first air bag is shrunk.

7. The vehicle seat device according to claim 1, further comprising:

a back base provided in the seat back;

a cushion base rotatably connected to the back base;

a pair of cushion side bases rotatably connected to the cushion base on both side portions in a width direction of the cushion base;

a first air bag serving as the air bag which is interposed between the back base serving as the base member and the cushion base serving as the movable member;

a second air bag serving as the air bag which is interposed between the cushion base serving as the base member and each cushion side base serving as the movable member;

a first clutch mechanism serving as the clutch mechanism which is interposed between the back base serving as the base member and the cushion base serving as the movable member; and a second clutch mechanism serving as the clutch mechanism which is interposed between the cushion base serving as the base member and each cushion side base serving as the movable member, wherein when the cushion base reaches the deployment position from the storage position, the cushion base is opened with respect to the back base to be located on the seat cushion, and when both the cushion side bases reach the deployment position from the storage position, both the cushion side bases are opened with respect to the cushion base in width directions opposite to each other, and thereby the seat mode is changed from a normal mode to a child seat mode in which a child seat is deployed on the seat cushion.

8. The vehicle seat device according to claim 7, further comprising:

an air bag actuator which individually supplies or discharges air to the first and second air bags; and a control member which controls the air bag actuator to be driven, wherein the control member includes a first deployment driving unit which inflates the first air bag, and a second deployment driving unit which inflates the second air bag in a state where the first air bag is inflated.

9. A vehicle seat device comprising:

a base member which is provided in one of a seat cushion and a seat back;

a movable member which is rotatably connected to the base member; and a pair of stopper parts which are disposed so as to abut against each other on the base member and the movable member, wherein the movable member rotates in a deployment direction which is one direction from a storage position, with respect to the base member, and the rotation of the movable member is restricted at a deployment position at which both the stopper parts abut against each other so that a seat mode is changed, and the vehicle seat device further comprises an air bag which is interposed between the base member and the movable member and presses the base member and the movable member as the air bag is inflated to rotate the movable member from the storage position toward the deployment position;

a clutch mechanism which is interposed between the base member and the movable member, allows the rotation of the movable member in the deployment direction, and restricts the rotation of the movable member, which is located at the deployment position, in a storage direction opposite to the deployment direction;

a back base provided in the seat back;

a cushion base rotatably connected to the back base;

a pair of cushion side bases rotatably connected to the cushion base on both side portions in a width direction of the cushion base;

a first air bag serving as the air bag which is interposed between the back base serving as the base member and the cushion base serving as the movable member;

a second air bag serving as the air bag which is interposed between the cushion base serving as the base member and each cushion side base serving as the movable member;

a first clutch mechanism serving as the clutch mechanism which is interposed between the back base serving as the base member and the cushion base serving as the movable member; and a second clutch mechanism serving as the clutch mechanism which is interposed between the cushion base serving as the base member and each cushion side base serving as the movable member, and when the cushion base reaches the deployment position from the storage position, the cushion base is opened with respect to the back base to be located on the seat cushion, and when both the cushion side bases reach the deployment position from the storage position, both the cushion side bases are opened with respect to the cushion base in width directions opposite to each other, and thereby the seat mode is changed from a normal mode to a child seat mode in which a child seat is deployed on the seat cushion.

10. The vehicle seat device according to claim 9, further comprising:

an air bag actuator which individually supplies or discharges air to the first and second air bags; and a control member which controls the air bag actuator to be driven, wherein the control member includes a first deployment driving unit which inflates the first air bag, and a second deployment driving unit which inflates the second air bag in a state where the first air bag is inflated.

* * * * *